United States Patent
Natanzon

(10) Patent No.: US 10,148,751 B1
(45) Date of Patent: Dec. 4, 2018

(54) ASYMMETRIC ACTIVE-ACTIVE STORAGE FOR HYPER-CONVERGED SYSTEM

(71) Applicant: EMC IP Holding Company LLC, Hopkinton, MA (US)

(72) Inventor: Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 455 days.

(21) Appl. No.: 14/980,889

(22) Filed: Dec. 28, 2015

(51) Int. Cl.
*H04L 29/08* (2006.01)

(52) U.S. Cl.
CPC ...... *H04L 67/1095* (2013.01); *H04L 67/1097* (2013.01)

(58) Field of Classification Search
CPC .......... H04L 67/1095; H04L 67/1097
See application file for complete search history.

(56) References Cited

U.S. PATENT DOCUMENTS

| | | |
|---|---|---|
| 9,378,261 B1 | 6/2016 | Bono et al. |
| 9,460,028 B1 | 10/2016 | Raizen et al. |
| 9,778,865 B1 | 10/2017 | Srinivasan et al. |
| 9,830,082 B1 | 11/2017 | Srinivasan et al. |
| 9,880,777 B1 | 1/2018 | Bono et al. |
| 9,946,649 B1 | 4/2018 | Natanzon et al. |
| 2010/0162032 A1* | 6/2010 | Dodgson ............ G06F 11/1456 714/4.11 |
| 2014/0089545 A1* | 3/2014 | Samanta ................ G06F 13/14 710/200 |
| 2016/0127462 A1* | 5/2016 | Mu ..................... H04L 67/1095 709/219 |
| 2017/0193002 A1* | 7/2017 | Shvachko ......... G06F 17/30174 |

* cited by examiner

*Primary Examiner* — Gil H. Lee
(74) *Attorney, Agent, or Firm* — BainwoodHuang

(57) ABSTRACT

A technique for providing active-active access to data over distance includes designating a first geographical site as a preferred site and designating a second geographical site as a non-preferred site. In response to a computing node at either site encountering a write request to write data to a storage object shared across both sites, the write request is handled by the preferred site, where the specified data is written to local storage at the preferred site and mirrored to local storage at the non-preferred site.

21 Claims, 8 Drawing Sheets

ASYMMETRIC ACTIVE-ACTIVE STORAGE FOR HYPER-CONVERGED SYSTEM

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems are sometimes deployed across two geographical sites, with the two sites acting as mirrors to each other and storing the same data. For example, IO (Input/Output) requests specifying writes to a data storage system at a first site may be mirrored to a data storage system at a second site, such that the same writes are performed at both sites. Some arrangements may support reading and writing from both sites, in a so-called "active-active" arrangement, with communication protocols maintaining consistency and coherence between sites. A well-known system for supporting active-active data access over distance is the VPLEX family of storage systems, available from EMC Corporation of Hopkinton, Mass.

SUMMARY

Unfortunately, available solutions for providing active-active access to storage over distance are optimized for small numbers of data storage systems at each site. Increasingly, however, data storage functionality is provided in so-called hyper-converged infrastructures, where large numbers of computing nodes are provided at each site and each computing node includes data storage functionality, networking functionality, and host application processing. Hyper-converged nodes may be provided in clusters or other aggregations, where multiple computing nodes run multiple instances of host applications and access local storage. Available solutions for active-active data access over distance may not be economical or effective when applied to large numbers of hyper-converged computing nodes.

In addition, available solutions for providing active-active access over distance operate symmetrically, with data storage systems at each site being equally able to read and write data that is redundantly shared across the sites. With this arrangement, data availability may be susceptible to network outages. For example, symmetrical active-active systems may operate asynchronously, achieving consistency in data stored at the two sites over time, but not instantaneously. Thus, a network outage can result in inconsistent data between sites. Administrators may thus be faced with a choice between waiting a potentially long period of time for the network outage to be corrected, at which point synchronization can resume, or rolling back each site to an earlier application-consistent point in time, in which case some recent data will be lost. What is needed is a solution for providing active-active data access over distance that is resilient in the face of network interruptions and that scales economically and effectively to support hyper-converged deployments.

In contrast with the above-described prior approach, an improved technique for providing active-active access to data over distance includes designating a first geographical site as a preferred site with respect to a storage object and designating a second geographical site as a non-preferred site with respect to that storage object. Each site operates multiple computing nodes with access to local storage at the respective site. The storage object is redundantly shared across the local storage at both sites. In response to a computing node at either site encountering a write request to write data to the storage object, the write request is processed by the preferred site, where the specified data is written to local storage at the preferred site and mirrored to local storage at the non-preferred site.

Advantageously, the preferred site stores the most recent data for the storage object. Therefore, the preferred site can be relied upon to provide a current version of the storage object even if a network outage occurs between sites. Delays incurred while waiting for the network outage to be corrected are avoided, as is the need to roll back to an earlier version of the data. Moreover, embodiments of the improved technique scale effectively and economically to large numbers of computing nodes and are thus well-suited for hyper-converged deployments.

In some examples, the computing nodes, or some subset thereof, are hyper-converged storage nodes, each including data storage functionality as well as host application processing.

In some examples, the designation of the preferred site and the non-preferred site is provided on a per-storage-object basis, with different storage objects having different preferred and non-preferred sites, e.g., to balance workload and/or to take advantage of locality.

In some examples, the designation of the preferred site and the non-preferred site for a storage object can be changed. For example, if an application instance running on a computing node at the preferred site is moved to a computing node at the non-preferred site, the designation of preferred and non-preferred sites may be switched, i.e., to co-locate the node running the application with preferred site of the application's storage.

Certain embodiments are directed to a method of providing asymmetric active-active access to data across multiple geographical sites. The method includes operating multiple computing nodes at a first site and multiple computing nodes at a second site, the first site and the second site each having respective local storage, the local storage at the first site storing a first version of a storage object and the local storage at the second site storing a second version of the storage object. In response to an IO splitter in a first computing node at the first site receiving a first IO request that specifies a first set of data to be written to the storage object, the method further includes splitting the first IO request to direct writing of the first set of data both to the first version of the storage object at the first site and to the second version of the storage object at the second site. In response to an IO splitter in a second computing node at the second site receiving a second IO request specifying a second set of data to be written to the storage object, the method still further includes forwarding the second IO request to a computing node at the first site, the IO splitter of the computing node at the first site then splitting the second IO request to direct writing of the second set of data both to the first version of the storage object at the first site and to the second version of the storage object at the second site.

Other embodiments are directed to a hyper-converged system. The system includes multiple computing nodes at a first site and multiple computing nodes at a second site. The first site and the second site each have respective local storage, the local storage at the first site storing a first version of a storage object and the local storage at the second site storing a second version of the storage object. The system is constructed and arranged to respond to write requests based on site preference.

Still other embodiments are directed to a computer program product. The computer program product stores instructions which, when executed on control circuitry of multiple computing nodes, cause the control circuitry to carry out a method of providing asymmetric active-active access to data across multiple geographical sites.

The foregoing summary is presented for illustrative purposes to assist the reader in readily understanding example features presented herein and is not intended to be limiting in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for providing active-active access to data over distance includes designating a first geographical site as a preferred site with respect to a storage object and designating a second geographical site as a non-preferred site with respect to that storage object. In response to a computing node at either site encountering a write request to write data to a storage object shared across both sites, the write request is processed by the preferred site, where the specified data is written to local storage at the preferred site and mirrored to local storage at the non-preferred site.

Figure 1:
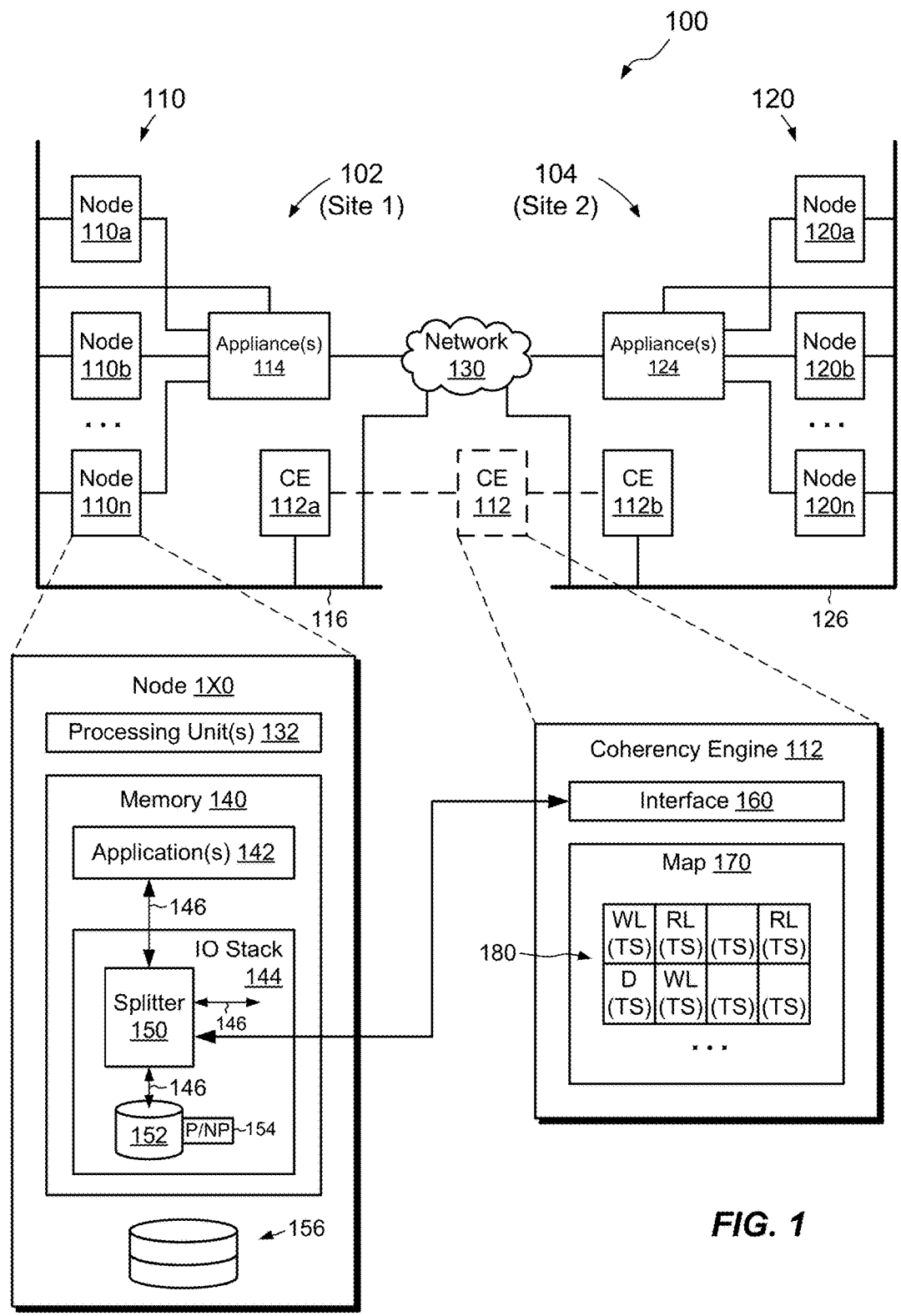
FIG. 1 is a block diagram of an example environment in which embodiments of the improved technique hereof can be practiced.

FIG. 1 shows an example environment 100 in which embodiments of the improved technique hereof can be practiced. Here, a first site 102 and a second site 104 provide asymmetric, active-active, read/write access to data redundantly stored at both sites. The two sites 102 and 104 may be geographically separated from each other, such as in different rooms, buildings, cities, or countries; although this is not required. Computing nodes ("nodes") 110a-110n operate at the first site 102, and computing nodes 120a-120n operate at the second site 104; there is no need for the two sites 102 and 104 to have the same number of nodes, however. A coherency engine 112 is distributed across both sites 102 and 104. In an example, the coherency engine 112 is implemented with a first component 112a at the first site 102 and a second component 112b at the second site 104. Alternatively, the coherency engine 112 may be provided as a single component or as greater than two components. In some examples, the components of the coherency engine 112 are provided as software constructs that run on particular ones of the nodes 110 and/or 120, or on each of the nodes 110 and 120 in some cases. The coherency engine 112 maintains write locks and read locks on particular regions of storage objects shared across the sites 102 and 104 and thus assists in coordinating reads and writes within and between sites. A network 130, such as a LAN (Local Area Network), WAN (Wide Area Network), the Internet, or some other type of network or combination of networks, interconnects the first site 102 and the second site 104.

Optionally, a first set of appliances 114 interconnect splitters 150 on each of the nodes 110 to the network 130 at the first site 102. In addition, a second set of appliances 124 interconnect splitters 150 on each of the nodes 120 to the network 130 at the second site 104. The appliances 114 and 124 buffer and serialize IO requests from splitters 150 to transmit IO requests between sites 102 and 104. Appliances 114 and 124 may also provide data compression to reduce traffic over the network 130. In some examples, the appliances 114 and 124 are implemented as software constructs. Such software-implemented appliances may be run within nodes 110 and/or 120, within some subset of the nodes 110 and/or 120, and/or on separate computers (not shown). According to one variant, appliances 114 and 124 run within containers on respective computing nodes 110/120, where each container is a software process that creates an isolated userspace instance. Appliances 114 and 124 may be run as virtual appliances or as separate processes. It should be appreciated that software-implementations of appliances 114 and 124 may be particularly well-suited for hyper-converged deployments.

As further shown in FIG. 1, inter-site network 116 interconnects the nodes 120, coherency engine component 112a, and appliance(s) 114 at the first site 102, while inter-site network 126 interconnects the nodes 130, coherency engine component 112b, and appliance(s) 124 at the second site 104. The inter-site networks 116 and 126 may be provided as LANs (Local Area Networks), as virtual networks, or as other types of communication networks.

FIG. 1 further shows an example node 1X0, which is intended to be representative of all nodes 110 and 120, although it is understood that the nodes 110a-110n and 120a-120n may differ in their particular details. The node 1X0 is seen to include processing units 132, i.e., one or more processing chips, cores, and/or assemblies, memory 140, and local storage 156, such as one or more magnetic disk drives, solid state drives, network drives, cloud-based drives, and the like. The memory 140 may include both volatile memory (e.g., RAM) and non-volatile memory. Also, the memory 140 includes a variety of software constructs realized in the form of executable instructions. When the executable instructions are run by the set of processing units 132, the set of processing units 132 are caused to carry out the operations of the software constructs. Although certain software constructs are specifically shown and described, it is understood that the memory 140 typically includes many other software constructs, which are not shown, such as an operating system and various processes and daemons.

As further shown in FIG. 1, the memory 140 of node 1X0 includes a set of application instances 142, i.e., one or more instances of one or more application programs, and an IO stack 144. Non-limiting examples of application instances 142 include database applications, webservers, desktop applications, virtual machines, virtual machine file systems, network file systems, and distributed applications, for example. The IO stack 144 provides an execution path for IO requests 146, which may originate from application(s) 142. The IO requests 146 specify reads and/or writes of application data. Although not shown, one or more client machines, e.g., desktop computers, laptop computers, servers, tablets, smart phones, set top boxes, etc., may connect to the node 1X0, e.g., over the network 130, to interact with the application(s) 142.

The IO stack 144 is seen to include a splitter 150 and a storage object 152. In an example, the storage object 152 is a block-based object, such as a storage volume, LU (Logical Unit), or other block-based device, to which block-based requests are directed. In an example, the storage object 152 is a logical structure backed by the local storage 156 at the same node, and/or by other local storage located elsewhere at the same site. The splitter is placed in-line with IO requests 146 and may respond to IO requests 146 in various ways. For example, the splitter 150 may be configured to pause the propagation of IO requests 146 through the IO stack 144, to flush IO requests 146 to the storage object 152, and/or to forward IO request 146 to a node on the other site. As will be described in more detail below, the splitter 150 may be further configured to respond differently to reads and writes, to respond differently depending on the storage object to which IO requests 156 are directed, and to respond differently based on whether the splitter 150 operates at a preferred site or at a non-preferred site with respect to a storage object. The storage object 152 has a site preference 154, which indicates whether the storage object 152 is Preferred or Non-Preferred at the site in which it is found. The splitter 150 is also configured to communicate with the coherency engine 112, e.g., to acquire, release, and manage read locks and write locks.

FIG. 1 further shows an example coherency engine 112 in greater detail. Here, coherency engine 112 includes an interface 160, e.g., for communicating with splitters 150 on different nodes 110 and/or 120, and a map 170. The map 170 tracks storage locks, such as read locks (RL) and write locks (WL), for different regions of storage objects within the environment 100. For example, storage locks 180 pertain to the storage object 152. Other storage locks (not shown) may be provided for other storage objects. In an example, the map 170 includes a timestamp (TS) for each region whose storage locks are tracked by the map 170. The timestamp for each region indicates the last time a write lock (WL) was released from that region. In some examples, the site preferences 154 of storage objects may be tracked by the coherency engine 112 instead of by the nodes 110 and 120.

The sites 102 and 104 provide redundant storage of storage objects. For example, the storage object 152 may be provided both as a first version on a node 110 at the first site 102 and as a second version on a node 120 at the second site 104. Local storage 156 at the first site 102 backs the first version, and local storage 156 at the second site 104 backs the second version. It is not required, however, that the local storage 156 that backs the second version of the storage object 152 at the second site 104 be the same type of storage or be configured the same way as the local storage 156 that backs the first version of storage object 152 at the first site 102. Also, it should be appreciated that local storage 156 for backing each version of the storage object 152 need not be provided entirely on one node and may in fact be distributed across multiple nodes at the same site. The example shown is thus intended merely to be illustrative.

The local storage 156 may be implemented in a variety of ways. In some examples, such as that shown, each node 110 or 120 may include its own instance of local storage 156. In other examples, multiple nodes may share common storage, such as one or more data storage arrays. One non-limiting example of a data storage array is the VMAX family of storage systems available from EMC Corporation. Still further examples include so-called software-defined storage, such as that provided by ScaleIO, also available from EMC Corporation. The local storage 156 may be implemented in any of these ways, in other ways, or as combinations of any of the foregoing, for example.

In example operation, some or all of computing nodes 110 run application instances 142 at the first site 102. Likewise, some or all of computing nodes 120 run application instances 142 at the second site 104. Each site redundantly stores the storage objects (like 152) of the other and provides active-active access to those storage objects. As the application instances 142 run, they generate IO requests 146 to read and write the storage objects. The IO requests 146 propagate through IO stacks 144 on respective nodes and reach respective splitters 150. For IO requests 146 specifying writes, the splitters 150 respond to the IO requests 146 asymmetrically based on site preference. In an example, each storage object has a respective site preference, e.g., as indicated by attribute 154.

For example, IO requests 156 specifying writes to a storage object are handled by the preferred site for that storage object. If a splitter 150 on a node 110 receives a write request for a storage object whose preferred site is site 102, then the splitter 150 performs the write locally at site 102 and mirrors the write to a node 120 at site 104. The data specified in the write request will thus be written at both sites.

However, if a splitter 150 on a node 120 at site 104 receives a write request for a storage object whose preferred site is site 102, then the splitter 150 on the node 120 forwards the write request synchronously to a node 110 at site 102, the preferred site. The node 110 at site 102 then handles the write locally at site 102 and mirrors the write to a node 120 at site 104 (e.g., to the same node that originated the request).

In an example, write locks, tracked by the coherency engine 112, are applied globally across both sites 102 and 104 whenever writes are performed by the preferred site. Each global write lock may be acquired and released only by a node at the preferred site. Write locks prevent both reads and other writes from being processed at the same respective regions while the write locks are in place.

In an example, read locks, also tracked by the coherency engine 112, are applied locally within the respective sites where the reads are requested and do not propagate to the other site. Read locks may be taken to prevent writes from occurring while data is being read and to assure that data can be read locally. For example, if a read lock has been acquired on a region of a storage object and a write request then arrives specifying data to be written to the same region, the write request may be delayed until after the read lock has been released.

It can thus be seen that the arrangement of FIG. 1 provides asymmetric, active-active access to storage objects across sites, but in a manner that preserves the most recent states of the storage objects at their preferred sites. A most recent version of any storage object can thus be found at its preferred site, even if the network 130 suffers a failure. Also, the modularity of nodes 110 and 120, which are flexibly connected to local storage 156, promotes a high degree of scalability for hyper-converged deployments.

Figure 2:
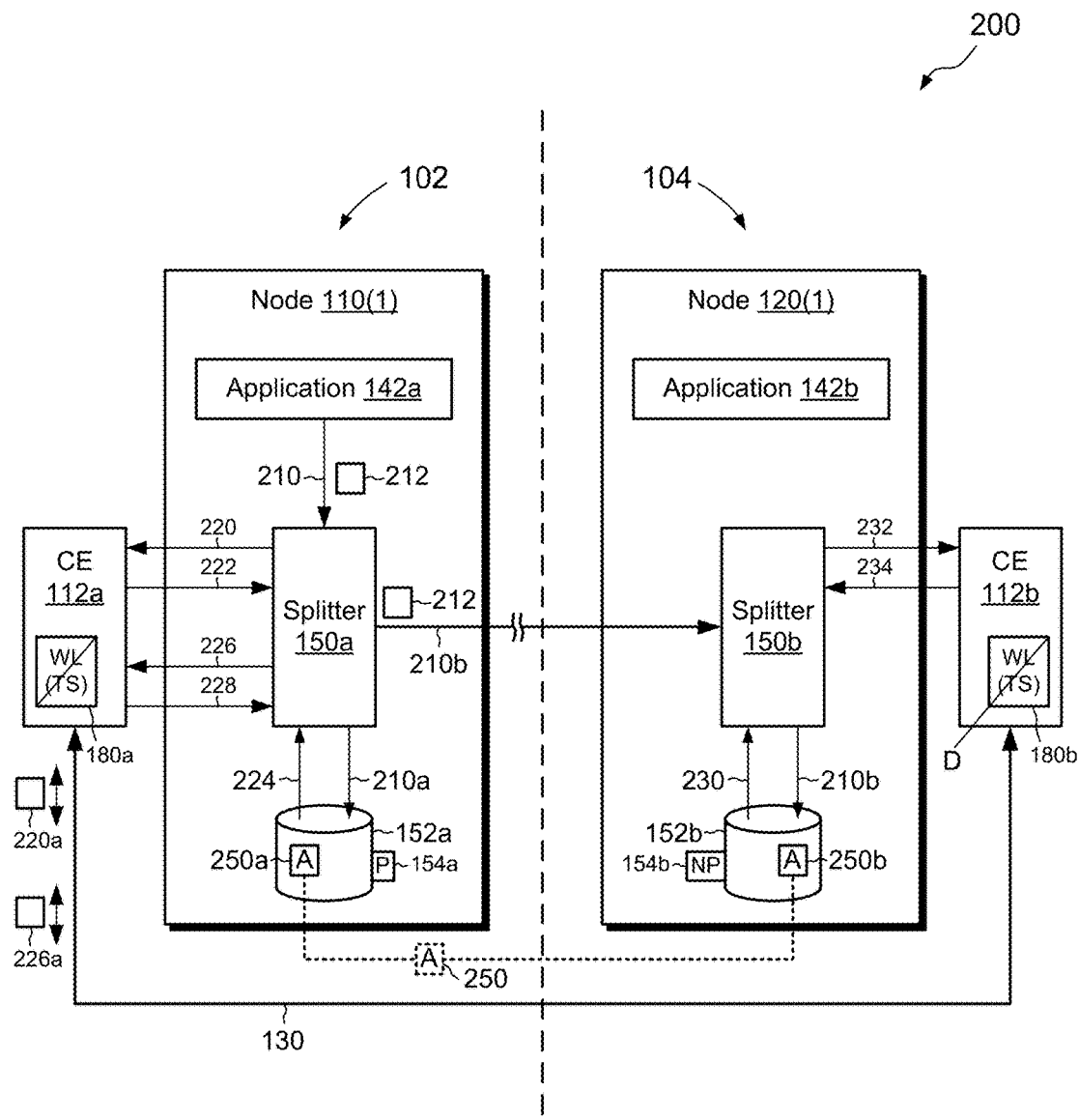
FIG. 2 is a block diagram showing an example arrangement for processing a write request initiated at a preferred site.

FIG. 2 shows an example arrangement for performing a write to a storage object, where the write originates at the preferred site for that storage object. In the illustrated example, certain features of FIG. 1 are omitted for simplicity, as the focus here is on a single node 110(1) at the first site 102 and a single node 120(1) at the second site 104. Both versions of storage object 152 are shown, i.e., the first version (152a) and the second version (152b). As indicated by attributes 154a and 154b, the first site 102 is preferred with regard to storage object 152 and the second site is non-preferred with regard to storage object 152.

The process for writing may begin with application 142a on node 110(1) issuing an IO request 210 that specifies data 212 to be written to a region "A" of storage object 152. In an example, the IO request 210 originates as a result of interaction of a client machine (not shown) with application 142a, although IO request 210 may also originate without client interaction (i.e., no client machine is required).

The IO request 210 propagates down the IO stack (FIG. 1) of node 110(1) and reaches splitter 150a. Splitter 150a detects the storage object 152 to which the IO request 210 is directed and the site preference of that storage object, e.g., via reference to attribute 154a. Detecting that site 102 is the preferred site for storage object 152, the splitter 150a proceeds accordingly by handling the write locally.

For example, the splitter 150a synchronously acquires a write lock on region A across the sites 102 and 104. For instance, the splitter 150a sends a lock request 220 to the first coherency engine component 112a to obtain a write lock on region A. The first coherency engine component 112a forwards the lock request 220 to the second coherency engine component 112b at site 104 (e.g., via a transmission 220a over network 130), and the second coherency engine component 112b acquires a remote version of the write lock on region A, e.g., at a location 180b of a remote map 170. The second coherency engine component 112b then confirms the locked state back to the first coherency engine component 112a at the first site 102. The first coherency engine component 112a acquires a local version of the write lock on region A, e.g., at location 180a of a local map 170. Once both versions of the write lock on region A have been acquired, the first coherency engine component 112a replies to the splitter 150a with lock confirmation 222.

Upon receiving lock confirmation 222, the splitter 150a splits the IO request 210, e.g., by flushing a local version 210a of IO request 210 to the first version 152a of the storage object 152 and also forwarding another version 210b of IO request 210 to node 120(1) at the second site 104.

At node 110(1), the local version 210a of the IO request 210 propagates to the local version 152a of the storage object 152, where the first node 110(1) writes the set of data 212 to a local version 250a of region A. Once the write is complete, the node 110(1) provides the splitter 150a an acknowledgement 224 of completion. Upon receiving the acknowledgement 224, the splitter 150a sends release request 226 to the first coherency engine component 112a to asynchronously release the write lock on region A. In response to the request 226, the first coherency engine component 112a sends release request 226a to the second coherency engine component 112b. The second coherency engine component 112b releases the remote version of the lock at location 180b and confirms back to the first coherency engine component 112a. The first coherency engine component 112a releases the local version of the lock on region A (location 180a) and, with both versions of the lock released, returns release confirmation 228 to the splitter 150a. The splitter 150a may then acknowledge completion of the IO request 210 back to the application 142a.

In an example, the write lock on region A is released when the set of data 212 has been written at the preferred site (site 102). It should be understood that delays through the network 130 and through the appliances 114 and 124 (FIG. 1) may defer storage of data 212 at the second site 104. Thus, when releasing the remote version of the write lock on region A (at 180b), the coherency engine component 112b may mark the region A as dirty (D), e.g., in its own version of the map 170 (FIG. 1). The "dirty" designation indicates that the data stored in region A (250b) in the second version 152b may not yet be current.

Also, when releasing the remote version of the write lock from region A (at 180b), the second coherency engine component 112b applies a timestamp (TS) to that same region. As will be described, the timestamp may be used in determining whether the version 250b of region A at the second site 104 is current and therefore whether it is clean or dirty. The first coherency engine component 112a may also apply a timestamp for the same region in its own local map 170.

In some examples, write locks at locations 180a and 180b are not immediately released when the write is complete. Rather, release of the write locks may be deferred until subsequent write locks or read locks are requested or until some period of time has passed. Such deferred release of write locks has the effect of reducing processing activity and network traffic in the environment 100. For example, locking involves round trip delays to the other site, so keeping a lock intact allows additional writes and reads to the same region to proceed without having to reacquire the lock and suffer the attendant delays.

In an example, updating the second version 250b of the region A at the second site 104 may proceed asynchronously. For example, at node 120(1), splitter 150b receives the forwarded version 210b of IO request 210 and processes it. Owing to network and appliance delays, the forwarded version 210b may arrive at the splitter 150b a significant time (e.g., seconds) after the data 212 was written at the first site 102 and the write lock was released.

In some examples, splitter 150b may acquire a local write lock on region A when writing the forwarded data 212. However, any such write lock would be local to the second site 104, e.g., to manage local contention, and need not be asserted across both sites.

Figure 3:
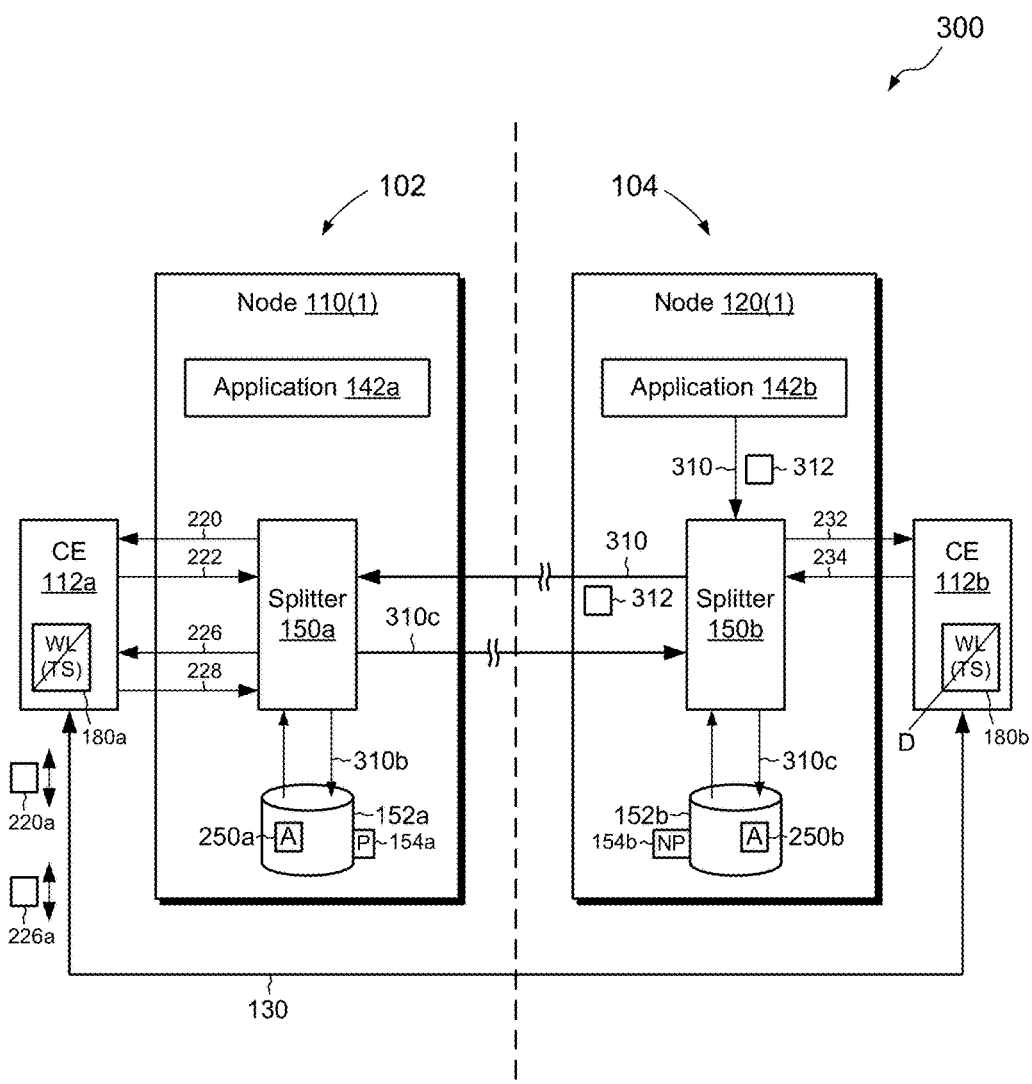
FIG. 3 is a block diagram showing an example arrangement for processing a write request initiated at a non-preferred site.

FIG. 3 shows an example arrangement for processing a write request that originates from a non-preferred site. The arrangement of FIG. 3 is similar to that of FIG. 2. Here, however, application 142b on node 120(1) at the second site 104 issues an IO request 310 specifying data 312 to be written to region A of storage object 152. The IO request 310 propagates to the splitter 150b, which detects that site 104 is not the preferred site. Rather than handling the IO request 310 locally, as was done in the arrangement of FIG. 2, the splitter 150b instead forwards the IO request 310 synchronously to the preferred site, e.g., to node 110(1).

Node 110(1) then handles the IO request 310 substantially as described above for IO request 210. For example, splitter 150a acquires a global write lock (at locations 180a and 180b) and splits the IO request 310. A local version 310b propagates to the first version 152a of storage object 152, where data 312 are written to the first version 250a of region A. A mirrored version 310c of IO request 310 is then returned to site 104, e.g., back to splitter 150b on node 120(1). In this arrangement, where data 312 are already present at node 120(1), it is not necessary to send the same data back with the mirrored IO request 310c. Rather, the IO request 310c may simply transmit metadata describing the request. The splitter 150b receives the mirrored request 310c, and proceeds to write the data 312 to the second version 152b of storage object 152, i.e., at the second version 250b of region A. Write locks in this arrangement may be managed substantially as described in connection with FIG. 2.

Considering FIGS. 2 and 3 together, it is apparent that write requests to a storage object are handled by a node at the preferred site for that storage object, regardless of whether the write requests originate from a node at the preferred site or from a node at the non-preferred site. The preferred site, which handles the write requests, direct writing of the specified data to both sites, with the non-preferred site generally being updated somewhat later than the preferred site.

Figure 4:
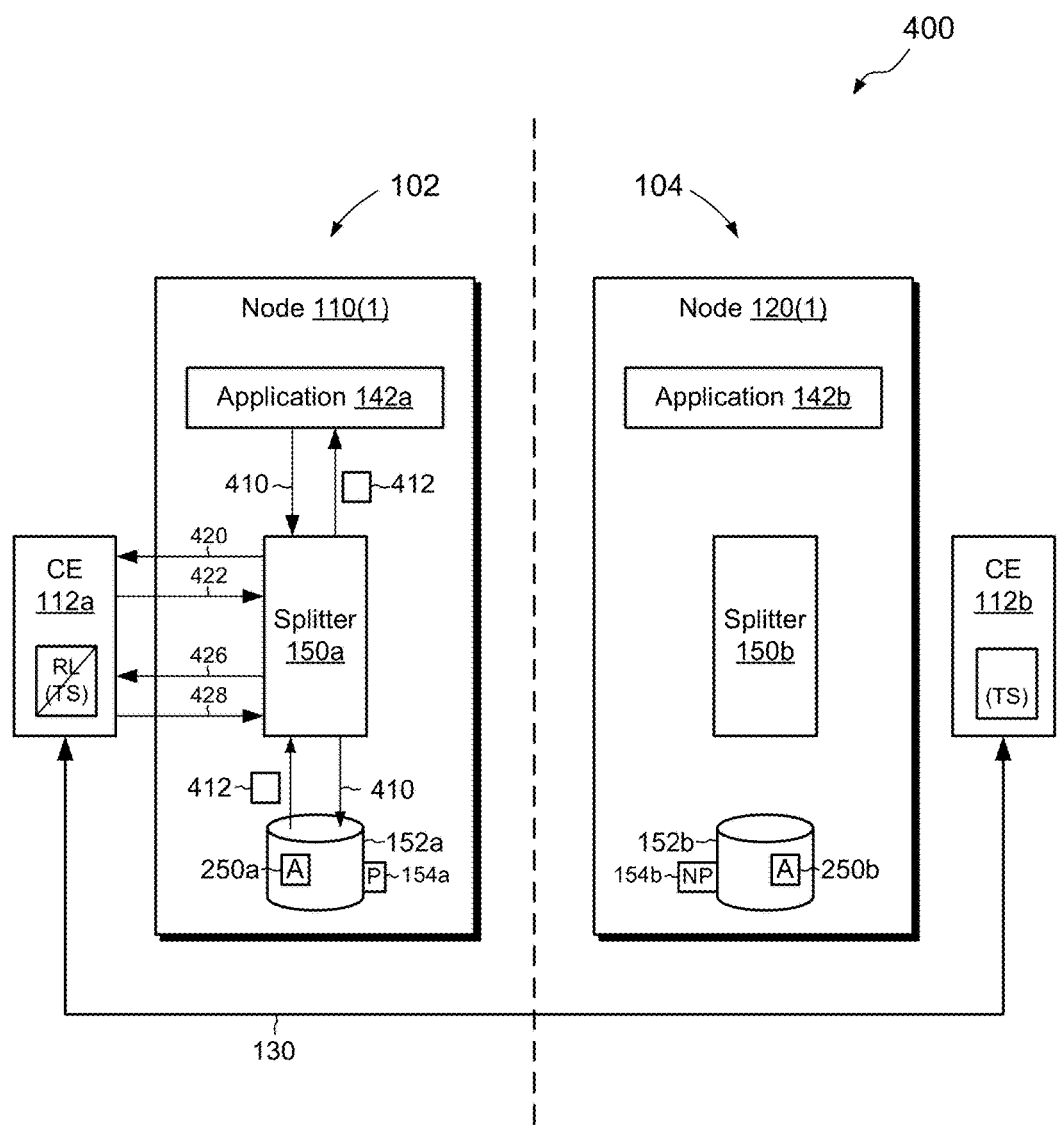
FIG. 4 is a block diagram showing an example arrangement for processing a read request initiated at the preferred site.

FIG. 4 shows an example arrangement for processing read requests that originate from a preferred site. Here, read requests are handled locally. For example, application 142a on node 110(1) at the first site 102 issues an IO request 410 specifying a read of region A in storage object 152. The splitter 150a receives the IO request 410 and detects that site 102 is the preferred site. The splitter 150 sends read lock request 420 to the first coherency engine component 112a, which acquires a local read lock (RL) on region A, provided that no other locks are in place for the same region. If a lock is already in place, the request 420 may be refused until the pending lock can be released. Once the first coherency engine component 112a acquires the read lock, it sends back response 422 confirming the read lock, whereupon the splitter 150a flushes the IO request 410 to the first version 152a of the storage object 152. The node 110(1) then reads the data 412 from the first version 250a of region A and returns the data 412 to the splitter 150a. The splitter 150a then releases the read lock, e.g., via request 426 and response 428, and passes the data 412 up the IO stack and back to the application 412.

It is thus evident that the read at the preferred site may be entirely local. No global read lock is required, only a local read lock to manage local contention, e.g., among nodes 110a-110n. In some examples, read locks are non-exclusive to one another. Thus, a read lock taken by a splitter 150 on one node may not prevent a splitter on another node from acquiring another read lock on the same region.

Figure 5:
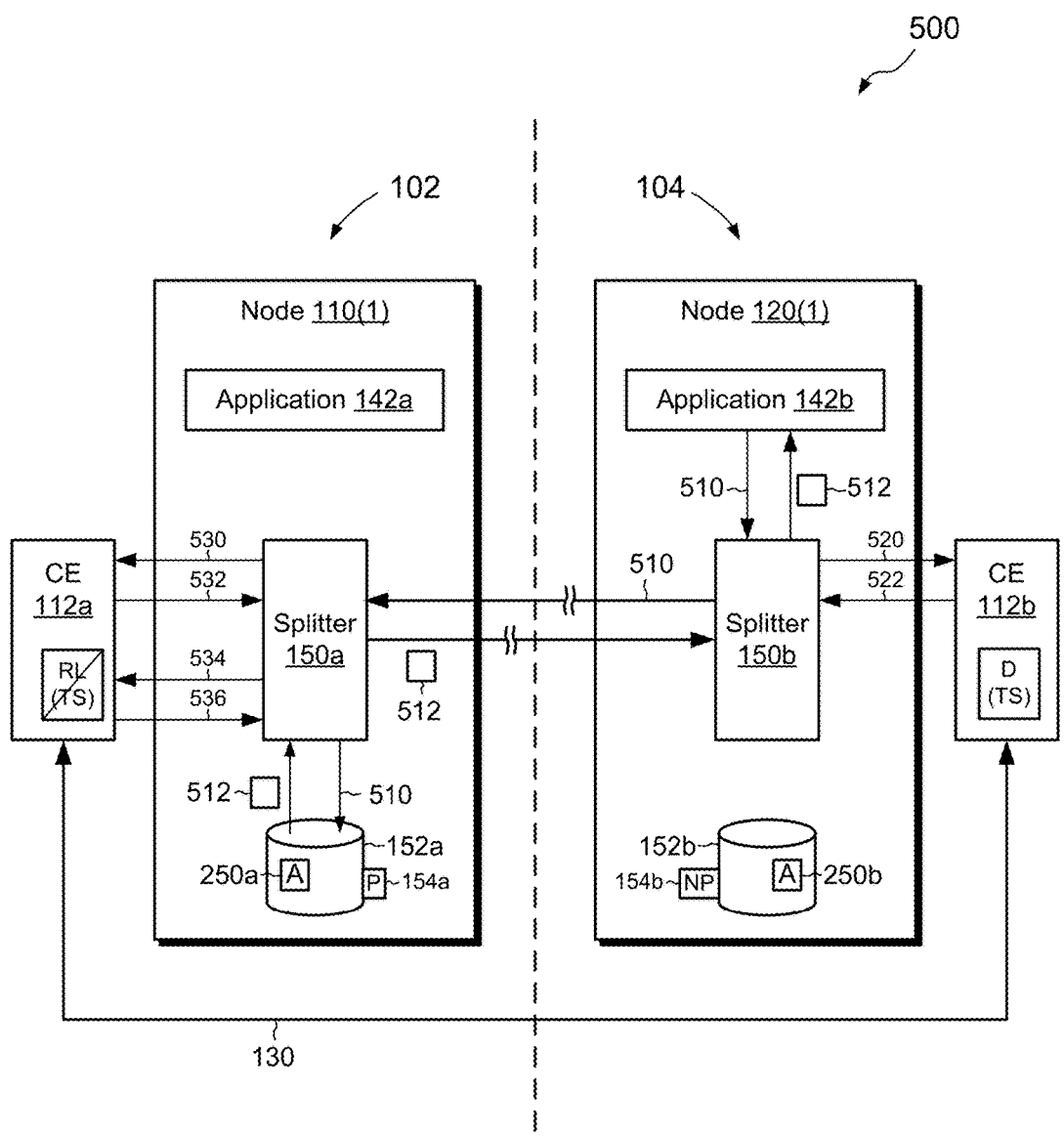
FIG. 5 is a block diagram showing an example arrangement for processing a read request initiated at the non-preferred site.

FIG. 5 shows an example arrangement for processing read requests that originate from a non-preferred site. Here, the application 142b running on node 120(1) at site 104 issues an IO request 510 specifying a read of region A in storage object 152. The splitter 150b receives the IO request 510 and detects that site 104 is not the preferred site. In an example, the splitter 150b then sends a query 520 to the second coherency engine component 112b to determine whether the region A is marked as dirty. If region A is not marked as dirty, then the second version 250b of region A is presumed to be current and the read is performed locally, i.e., using substantially the same process as described in connection with FIG. 4 above, i.e., for the preferred site. Although this scenario is not shown in FIG. 5, processing would include, for example, obtaining a local read lock from the second coherency engine component 112b, performing the read from the second version 152b of the storage object 152 to obtain data 512, and returning the data 512 to the application 142b. However, operation proceeds in the manner shown in FIG. 5 if the region A is marked as dirty in the second coherency engine component 112b.

As shown in FIG. 5, the splitter 150b forwards the IO request 510 to the first site 102, where the first version 250a of region A is current. Here, splitter 150a receives the IO request 510 and processes it locally. For example, splitter 150a requests and receives a local read lock (via request 530 and response 532) and flushes the IO request 510 down the IO stack. The node 110(1) then reads the data 512 from the first version 250a of region A and returns the data 512 to the splitter 150a. The splitter 150a releases the read lock (via request 534 and response 536) and returns the data 512 to the second site 104. The splitter 150b on node 120(1) receives the data 512 and returns the data to the application 142b.

It should be appreciated that read locks, like write locks, may be released immediately once the data is accessed or they may be held opportunistically for a period of time or until another read lock or write lock arrives. This ability to hold read locks even after the reads are complete further helps to promote processing and network efficiency.

Figure 6:
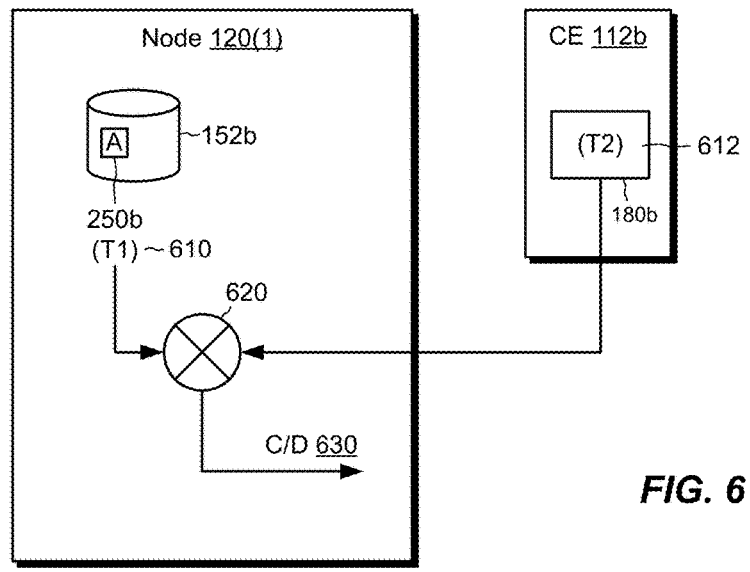
FIG. 6 is a block diagram showing an example arrangement for determining whether to process a read request locally at the non-preferred site or to forward the read request to the preferred site.

FIG. 6 shows an example arrangement for determining whether a region of a storage object is dirty at a non-preferred site. Here, node 120(1) at the second site 104 stores the second version 250b of region A in the second version 152b of the storage object 152. As the second site 104 is not the preferred site for the storage object 152, the second version 250b of region A may not be current, e.g., if network and/or appliance delays have slowed the arrival of data.

In the example shown, however, IO requests handled by the first site 102 are marked with a timestamp indicating a time when they were dispatched from the first site 102 to the second site 104. For example, the splitter 150a in node 110(1) at the first site 102 may apply a timestamp to each IO request it forwards to the second site 104 (see IO request 210a in FIG. 2, for example). Alternatively, the appliance(s) 114 may apply the timestamps to IO requests from the first site 102. In an example, each time the node 120(1) at the second site 104 updates the second version 250b of region A in response to an IO request arriving from the first site 102, it keeps the timestamp applied for that IO request. For instance, in the example shown, timestamp 610 is the timestamp of the most recently applied IO request from the first site 102.

In an example, the node 120(1) compares (620) this timestamp 610 with a timestamp 612 stored in the second coherency engine component 112b. The timestamp 612 indicates the last time that a global write lock was released from region A. If the timestamp 610 is earlier than the timestamp 612, then the version 250b of region A is not current. Region A may then be marked as dirty in the second coherency engine component 112b (see clean/dirty indicator 630). However, if the timestamp 610 is later than the timestamp 612, then the version 250b of region A is current and the region is not marked as dirty.

In an example, the node 120(1) may perform a read-splitting operation in response to receiving a read request. For example, the read-splitting operation is constructed and arranged to redirect the read IO request to the first site in response to the timestamp 610 indicating an earlier time than the timestamp 612. The read-splitting operation is further constructed and arranged to direct the read IO request to read locally in response to the timestamp 610 indicating a later time than the timestamp 612.

Figure 7:
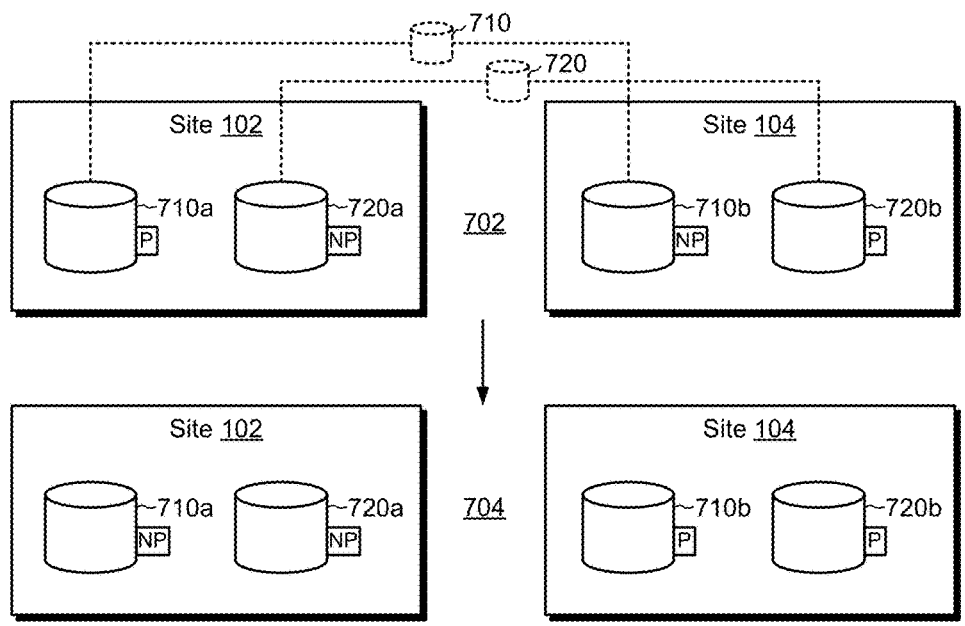
FIG. 7 is a block diagram shown example arrangements of preferred and non-preferred storage objects.

FIG. 7 shows an example arrangement for flexibly establishing preferred and non-preferred sites for storage objects. In a first scenario 702, storage object 710 has a first version 710a and a second version 710b, which are redundantly mirrored across sites 102 and 104. Likewise, storage object 720 has a first version 720a and a second version 720b, which are redundantly mirrored across sites 102 and 104. Site 102 is the preferred site for storage object 710, whereas site 104 is the preferred site for storage object 720.

In an example, preferred sites are selected based on locality, e.g., on the locations where the applications accessing the data are run and/or the locations where users of those applications are located. Thus, for example, in the first scenario 702, the choice of preferred sites may reflect the fact that an application accessing the data of storage object 710 runs on site 102 and an application accessing the data of storage object 720 runs on site 104.

Designations of preferred sites may be changed. For example, if the application accessing the storage object 710 is moved from site 102 to site 104, then, as shown in scenario 704, the designation of the preferred site for storage object 710 may be changed to site 104. As a result of this change, the manner in which reads and writes are processed to storage object 710 will be changed accordingly, to reflect the treatment of such requests as described in connection with FIGS. 2-6 for preferred and non-preferred sites.

Figure 8:
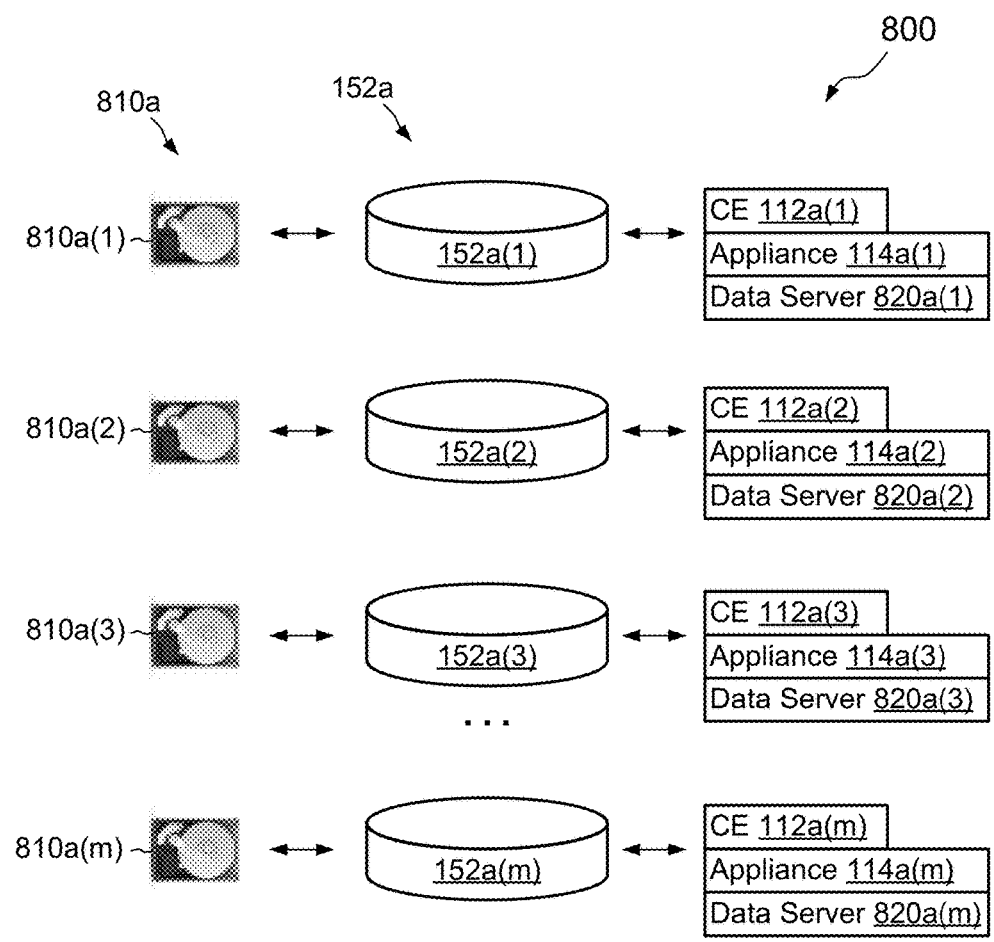
FIG. 8 is a block diagram showing an example arrangement for scaling out storage functionality.

FIG. 8 shows an example arrangement for scaling out functionality in the environment of FIG. 1. In the example shown, the first version 152a of storage object 152 at site 102 is rendered in the form of storage portions 152a(1) to 152a(m). Each storage portion may include any number of storage regions, such as region 250a (FIG. 2). In an example, each of storage portions 152a(1) to 152a(m) is backed by a respective set of storage drives (e.g., one or more disk drives, solid state drives, and the like), shown as drives 810a(1) to 810a(m). In addition, each of storage portions 152a(1) to 152a(m) is backed by a respective coherency engine component, 112a(1) to 112a(m), and a respective appliance, 114a(1) to 114a(m). In an example, the appliances 114a(1) to 114a(m) are implemented as software constructs running on the nodes 110 or on other computing devices at the first site 102. Optionally, a similar arrangement may be deployed for the second version 152b of the storage object 152, i.e., at the second site 104.

The above-described scale-out may be deployed completely, partially or in any combination. For example, multiple drives 810a(1) to 810a(m) may be provided, e.g., one per storage portion, but not multiple coherence engine components and/or multiple appliances. Likewise, multiple coherence engine components and/or multiple appliances may be provided, but not multiple drives. The arrangement may thus be scaled out in any manner that best suits demand.

In some examples, scale-out of storage may be achieved using software-defined storage, such as that provided by ScaleIO. For instance, each of storage portions 152a(1) to 152a(m) may be provided with a respective data server, 820a(1) to 820a(m). With this arrangement, the IO stack 144 in each of nodes 110 may be adapted to include a respective data client, e.g., below the splitter 150, with the data client communicatively connected to a respective data server to access a respective storage portion. To provide a particular example, a splitter 150 may be configured to flush to a data client, which operatively connects to data server 820a(1) for providing access to storage portion 152a(1).

Figure 9:
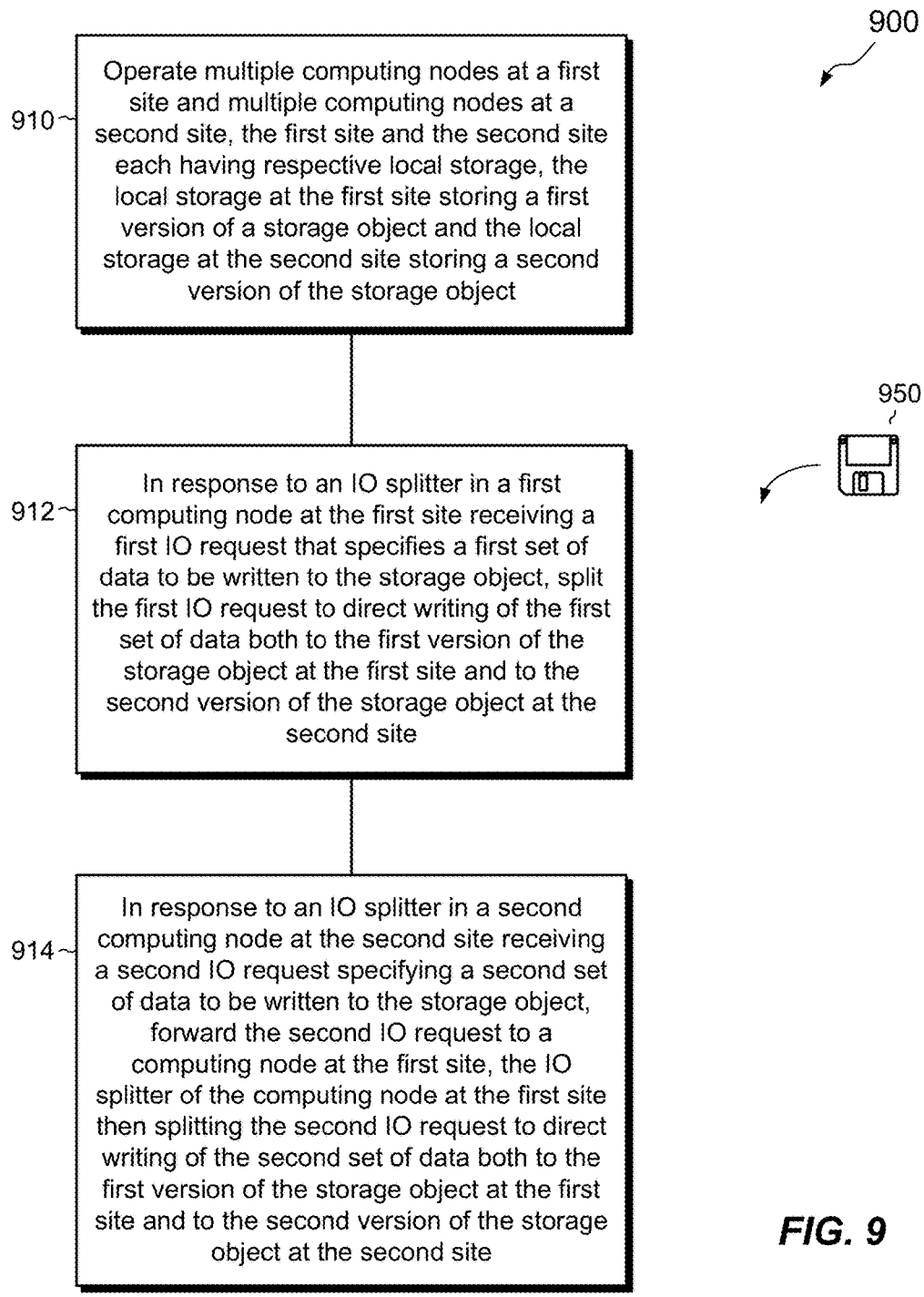
FIG. 9 is a flowchart showing an example method of providing asymmetric active-active access to data across multiple sites.

FIG. 9 shows an example process 900 for providing asymmetric active-active access to data across multiple sites. The process 900 may be carried out in connection with the environment 100 of FIG. 1, e.g., by the software constructs described in connection with FIGS. 1-6, which reside in the memories 140 of the computing nodes 110 and 120 and are run by respective sets of processing units 132. The various acts of the process 900 may be ordered in any suitable way. Accordingly, embodiments may be constructed in which acts are performed in orders different from those illustrated, which may include performing some acts simultaneously, even though the acts are shown as sequential in the illustrated embodiments.

At 910, multiple computing nodes 110 are operated at a first site 102 and multiple computing nodes 120 are operated at a second site 104 (FIG. 1). The first site 102 and the second site 104 each have respective local storage 156. The local storage 156 at the first site 102 stores a first version 152a of a storage object 152, and the local storage 156 at the second site 104 stores a second version 152b of the storage object 152 (FIG. 2). The local storage 156 at each site may be provided on a per-node basis, may be provided using one or more data storage arrays separate from particular nodes, may be provided using software-defined storage, and/or in any suitable way.

At 920, in response to an IO splitter (e.g., 150a) in a first computing node (e.g., 110(1)) at the first site 102 receiving a first IO request (e.g., 210) that specifies a first set of data (e.g., 212) to be written to the storage object 152 (FIG. 2), the first IO request 210 is split to direct writing of the first set of data 212 both to the first version 152a of the storage object 152 at the first site 102 (e.g., via IO request 210a) and to the second version 152b of the storage object 152 at the second site 104 (e.g., via IO request 210b).

At 930, in response to an IO splitter (e.g., 150b) in a second computing node (e.g., 120(1)) at the second site 104 receiving a second IO request (e.g., 310) specifying a second set of data (e.g., 312) to be written to the storage object 152 (FIG. 3), the second IO request 310 is forwarded to a computing node (e.g., 110(1)) at the first site 102, the IO splitter 150a of the computing node 110(1) at the first site 102 then splitting the second IO request 310 to direct writing of the second set of data 312 both to the first version 152a of the storage object 152 at the first site 102 and to the second version 152b of the storage object 152 at the second site 104.

An improved technique has been described for providing asymmetric, active-active access to data over distance. The technique includes designating a first geographical site as a preferred site with regard to a storage object (e.g., 152) and designating a second geographical site as a non-preferred site with regard to that storage object. Each site operates multiple computing nodes 110 or 120 with access to local storage 156 at the respective site. A storage object 152 in the local storage 156 at each site is redundantly shared across both sites. In response to a computing node at either site encountering a write request to write data to the storage object 152, the write request is handled by the preferred site, where the specified data is written to local storage 156 at the preferred site and mirrored to local storage at the non-preferred site.

Having described certain embodiments, numerous alternative embodiments or variations can be made. For example, although embodiments have been shown and described involving two sites 102 and 104, in which one site is preferred with regard to a storage object and the other site is not preferred, the invention hereof is not limited to two sites. For example, the principles disclosed herein may be applied with any number of sites, where one site is designated as the preferred site with regard to each storage object and the other sites are designated as non-preferred sites.

Also, although embodiments have been disclosed herein where the sites are geographically separated, they may alternatively be located together, e.g., in the same vicinity. No minimum distance between sites 102 and 104 is required.

Further, although embodiments disclosed herein are well-suited for hyper-converged deployments, the invention hereof is not limited to such deployments alone. For example, application instances 142 (FIG. 1) may be run on separate host computers, which connect to nodes 110 and 120 in the environment 100, e.g., over the network 130, to send IO requests to the nodes 110 and 120 and to receive responses thereto.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 950 in FIG. 9). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of providing asymmetric active-active access to data across multiple geographical sites, the method comprising:
operating multiple computing nodes at a first site and multiple computing nodes at a second site, the first site and the second site each having respective local storage, the local storage at the first site storing a first version of a storage object and the local storage at the second site storing a second version of the storage object;
in response to an IO splitter in a first computing node at the first site receiving a first IO request that specifies a first set of data to be written to the storage object, splitting the first IO request to direct writing of the first set of data both to the first version of the storage object at the first site and to the second version of the storage object at the second site; and
in response to an IO splitter in a second computing node at the second site receiving a second IO request specifying a second set of data to be written to the storage object, forwarding the second IO request to a computing node at the first site, the IO splitter of the computing node at the first site then splitting the second IO request to direct writing of the second set of data both to the first version of the storage object at the first site and to the second version of the storage object at the second site,
wherein the IO splitters in the first and second computing nodes are each configured to forward IO requests in a first mode and to split IO requests in a second mode.

2. The method of claim 1, wherein the first IO request is generated by a first application instance running on the first computing node and the second IO request is generated by a second application instance running on the second computing node.

3. The method of claim 2,
wherein the first IO request specifies a first region of the storage object to which the first set of data is directed, and
wherein the method further comprises, prior to splitting the first IO request, requesting a write lock on the first region of the storage object from a distributed coherency engine, the distributed coherency engine extending between the first site and the second site and asserting the write lock at both the first site and the second site.

4. The method of claim 3, wherein the distributed coherency engine has a first component running at the first site and a second component running at the second site, and wherein the method further comprises, after receiving the write lock on the first region of the storage object:
writing the first set of data to the first region in the first version of the storage object at the first site;
marking the write lock on the first region of the storage object as dirty in the second component of the distributed coherency engine; and writing the first set of data to the first region in the second version of the storage object at the second site.

5. The method of claim 4, further comprising:
receiving, by an IO splitter of a computing node in the second site, a read IO request to read the first region of the storage object; and
in response to the first region of the storage object being marked as dirty in the second component of the distributed coherency engine, redirecting the read IO request to the first site to obtain the first set of data from the first version of the storage object in the local storage at the first site.

6. The method of claim 5, further comprising, in response to redirecting the read IO request to the first site:
acquiring a read lock on the first region of the storage object from the first component of the distributed coherency engine; and
after acquiring the read lock, obtaining the first set of data from the first version of the storage object in the local storage at the first site.

7. The method of claim 4,
wherein, a set of write IO requests directed to the first region of the storage object and arriving at the second site from the first site each have a timestamp indicating a time at which data specified in the respective IO request was written at the first site, the second site providing a first timestamp reflecting the timestamp of the write IO request whose data were most recently written to first region of the storage object at the second site, and
wherein the second component of the coherency engine is provided with a second timestamp that indicates a last time that a write lock was released from the first region of the storage object, and
wherein the method further comprises:
receiving, by an IO splitter of a computing node at the second site, a read IO request to read the first region of the storage object; and
performing, by the IO splitter, a read-splitting operation, the read-splitting operation constructed and arranged to (i) redirect the read IO request to the first site to effect reading from the first region of the storage object in the first version in response to the first timestamp indicating an earlier time than the second timestamp and (ii) directing the read IO request to effect local reading of the first region of the storage object in the second version in response to the first timestamp indicating a later time than the second timestamp.

8. The method of claim 2, wherein the first site is a preferred site with respect to the storage object and the second site is a non-preferred site with respect to the storage object, wherein the non-preferred site is configured always to forward write IO requests directed to the storage object to the preferred site, and wherein the method further comprises:
in response to detecting that greater than a predetermined limit of write IO requests specifying data to be written to the storage object at the second site are forwarded to the first site, setting the second site to be the preferred site with respect to the storage object and setting the first site to be the non-preferred site with respect to the storage object.

9. The method of claim 2,
wherein the first site is a preferred site with respect to the storage object and the second site is a non-preferred site with respect to the storage object,
wherein the non-preferred site is configured always to forward write IO requests directed to the storage object to the preferred site, and
wherein the local storage at the first site and the local storage at the second site redundantly store a second storage object, the second site being a preferred site with respect to the second storage object and the first site being a non-preferred site with respect to the second storage object.

10. The method of claim 2, wherein the storage object includes multiple storage portions, and wherein the method further comprises operating a distributed coherency engine, the distributed coherency engine including, for each of the storage portions, a respective coherency engine component for that storage portion, each coherency engine component tracking write locks and read locks for the respective storage portion.

11. The method of claim 10, further comprising:
storing each storage portion in a respective set of storage devices at the first site; and
storing each storage portion in a respective set of storage devices at the second site.

12. The method of claim 10, wherein the first site and the second site each include a set of appliances constructed and arranged to serialize and buffer data being exchanged between the first site and the second site, and wherein the method further comprises:
for each storage portion stored at the first site, operating a respective dedicated appliance at the first site for serializing and buffering data of the respective storage portion, each dedicated appliance at the first site implemented as a software construct running on a computing node or other computing device at the first site; and
for each storage portion stored at the second site, operating a respective dedicated appliance at the second site for serializing and buffering data of the respective storage portion, each dedicated appliance at the second site implemented as a software construct running on a computing node or other computing device at the second site.

13. The method of claim 1,
wherein the first site is a preferred site with respect to the storage object and the second site is a non-preferred site with respect to the storage object, and
wherein the non-preferred site is configured always to forward write IO requests directed to the storage object to the preferred site.

14. A hyper-converged system, comprising:
multiple computing nodes at a first site;
multiple computing nodes at a second site;
a network coupling the computing nodes at the first site to the computing nodes at the second site;
the first site and the second site each having respective local storage, the local storage at the first site storing a first version of a storage object and the local storage at the second site storing a second version of the storage object,
wherein the hyper-converged system is constructed and arranged to:
in response to an IO splitter in a first computing node at the first site receiving a first IO request that specifies a first set of data to be written to the storage object, split the first IO request to direct writing of the first set of data both to the first version of the storage object at the first site and to the second version of the storage object at the second site; and in response to an IO splitter in a second computing node at the second site receiving a second IO request specifying a second set of data to be written to the storage object, forward the second IO request to a computing node at the first site, the IO splitter of the computing node at the first site then constructed and arranged to split the second IO request to direct writing of the second set of data both to the first version of the storage object at the first site and to the second version of the storage object at the second site, wherein the IO splitters in the first and second computing nodes are each configured to forward IO requests in a first mode and to split IO requests in a second mode.

15. The hyper-converged system of claim 14, wherein the storage object includes multiple storage portions, and wherein the system further comprises a distributed coherency engine, the distributed coherency engine including, for each of the storage portions, a respective coherency engine component for that storage portion, each coherency engine component tracking write locks and read locks for the respective storage portion.

16. The hyper-converged system of claim 15, further comprising:
   a respective set of storage devices at the first site in which each storage portion is stored; and
   a respective set of storage devices at the second site in which each storage portion is stored.

17. The hyper-converged system of claim 16, wherein the first site and the second site each include a set of appliances constructed and arranged to serialize and buffer data being exchanged between the first site and the second site, the first site including a respective dedicated appliance for each storage portion stored at the first site, the second site including a respective dedicated appliance for each storage portion stored at the second site.

18. A computer program product including a set of non-transitory, computer-readable media having instructions which, when executed by control circuitry of multiple computing nodes, cause the control circuitry to perform a method of providing asymmetric active-active access to data across multiple geographical sites, the method comprising:
   operating multiple computing nodes at a first site and multiple computing nodes at a second site, the first site and the second site each having respective local storage, the local storage at the first site storing a first version of a storage object and the local storage at the second site storing a second version of the storage object;
   in response to an IO splitter in a first computing node at the first site receiving a first IO request that specifies a first set of data to be written to the storage object, splitting the first IO request to direct writing of the first set of data both to the first version of the storage object at the first site and to the second version of the storage object at the second site; and
   in response to an IO splitter in a second computing node at the second site receiving a second IO request specifying a second set of data to be written to the storage object, forwarding the second IO request to a computing node at the first site, the IO splitter of the computing node at the first site then splitting the second IO request to direct writing of the second set of data both to the first version of the storage object at the first site and to the second version of the storage object at the second site, wherein the IO splitters in the first and second computing nodes are each configured to forward IO requests in a first mode and to split IO requests in a second mode.

19. The computer program product of claim 18, wherein the first IO request is generated by a first application instance running on the first computing node and the second IO request is generated by a second application instance running on the second computing node.

20. The computer program product of claim 19,
   wherein the first IO request specifies a first region of the storage object to which the first set of data is directed, and
   wherein the method further comprises, prior to splitting the first IO request, requesting a write lock on the first region of the storage object from a distributed coherency engine, the distributed coherency engine extending between the first site and the second site and asserting the write lock at both the first site and the second site.

21. The computer program product of claim 20, wherein the first site is a preferred site with respect to the storage object and the second site is a non-preferred site with respect to the storage object, wherein the non-preferred site is configured always to forward write IO requests directed to the storage object to the preferred site, and wherein the method further comprises:
   in response to detecting that greater than a predetermined limit of write IO requests specifying data to be written to the storage object at the second site are forwarded to the first site, setting the second site to be the preferred site with respect to the storage object and setting the first site to be the non-preferred site with respect to the storage object.

* * * * *